US012732438B2

(12) United States Patent
Hakala et al.

(10) Patent No.: US 12,732,438 B2
(45) **Date of Patent: *Sep. 8, 2026**

(54) SECURITY SERVICE ORCHESTRATION FUNCTION FOR COMMERCIAL SECURITY SERVICE LEVEL AGREEMENTS

(71) Applicant: Telefonaktiebolaget LM Ericsson (publ), Stockholm (SE)

(72) Inventors: Harri Hakala, Turki (FI); Ari Pietikäinen, Espoo (FI); Anu Puhakainen, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 87 days.

This patent is subject to a terminal disclaimer.

(21) Appl. No.: 18/574,411

(22) PCT Filed: Jul. 7, 2021

(86) PCT No.: PCT/EP2021/068810

§ 371 (c)(1),
(2) Date: Dec. 27, 2023

(87) PCT Pub. No.: WO2023/280398

PCT Pub. Date: Jan. 12, 2023

(65) Prior Publication Data

US 2024/0283713 A1 Aug. 22, 2024

(51) Int. Cl.
*H04L 41/5025* (2022.01)
*H04L 41/5054* (2022.01)

(52) U.S. Cl.
CPC ...... *H04L 41/5025* (2013.01); *H04L 41/5054* (2013.01)

(58) Field of Classification Search
None
See application file for complete search history.

(56) References Cited

U.S. PATENT DOCUMENTS

2007/0214208 A1* 9/2007 Balachandran ........ G06Q 10/10 709/201
2014/0108639 A1 4/2014 Nelke et al.
(Continued)

FOREIGN PATENT DOCUMENTS

WO 2017164784 A1 9/2017
WO 2023280397 A1 1/2023

OTHER PUBLICATIONS

Trapero, A novel approach to manage cloud security SLA incidents, 2017, Elsevier (Year: 2017).*
(Continued)

*Primary Examiner* — Fadi Haj Said
(74) *Attorney, Agent, or Firm* — Sage Patent Group

(57) ABSTRACT

A method implemented by a security service orchestration function (SSOF) in a communication infrastructure, that includes a communication service provider (CSP) and a plurality of enterprises, for orchestration of a security service level agreement (S-SLA). The method includes receiving a S-SLA request from one or more of the enterprises. Each S-SLA request includes a plurality of requirements. The method also includes converting each S-SLA request into a unique S-SLA corresponding to the plurality of requirements in the S-SLA request from an associated enterprise. Each unique S-SLA includes security attributes that the CSP is capable of providing. The method additionally includes offering the unique S-SLA to the associated enterprise for each enterprise that submitted the S-SLA request. The method further includes receiving a response from each enterprise. Each response includes an acknowledgement of the unique S-SLA or a decline of the unique S-SLA including a non-repudiation signature of acknowledgement or declining.

19 Claims, 9 Drawing Sheets

(56) References Cited

U.S. PATENT DOCUMENTS

| | | | | |
|---|---|---|---|---|
| 2019/0149581 | A1* | 5/2019 | Silvestro | H04L 63/0428 726/1 |
| 2020/0169478 | A1 | 5/2020 | Joshi et al. | |
| 2020/0177460 | A1 | 6/2020 | Xu et al. | |
| 2021/0067419 | A1* | 3/2021 | Adam | H04L 41/40 |
| 2021/0203570 | A9* | 7/2021 | Joshi | G06Q 30/0611 |

OTHER PUBLICATIONS

International Search Report and Written Opinion of the International Searching Authority, PCT/EP2021/068810, mailed Mar. 17, 2022, 14 pages.

Trapero, Ruben et al., "A novel approach to manage cloud security SLA incidents," Future Generation Computer Systems, vol. 72, Jul. 1, 2017, 13 pages.

Second Written Opinion of the International Preliminary Examining Authority for PCT/EP2021/068810, mailed May 16, 2023, 5 pages.

International Preliminary Report on Patentability of the International Preliminary Examining Authority for PCT/EP2021/068810, mailed Sep. 7, 2023, 24 pages.

International Search Report and Written Opinion of the International Searching Authority, PCT/EP2021/068807, mailed May 3, 2022, 29 pages.

Jaatun, Martin Gilje et al., "Security SLAs—An Idea Whose Time Has Come?" (Aug. 20, 2012), Advances in Biometrics: International Conference, ICB 2007, Seoul, Korea, Aug. 27-29, 2007, Proceedings, 8 pages.

* cited by examiner

800

802 804 806

| Information element | Description | Category |
|---|---|---|
| Target enterprise identifier | Indicates enterprise that requests the S-SLA fulfillment | Mandatory |
| Confidentiality attributes | Defines the confidentiality related security attributes to be fulfilled | Optional |
| Target integrity attributes | Defines the integrity related security attributes to be fulfilled | Optional |
| Target authentication attributes | Defines the authentication related security attributes to be fulfilled | Optional |
| Target availability attributes | Defines the availability related security attributes to be fulfilled | Optional |
| Target non-repudiation attributes | Defines the non-repudiation related security attributes to be fulfilled | Optional |
| Target isolation attributes | Defines the isolation related security attributes to be fulfilled | Optional |
| Target data sovereignty attributes | Defines the data sovereignty related security attributes to be fulfilled | Optional |
| Validity condition | Indicates that S-SLA applies only to the specific locations or area of interest | Optional |
| Temporal validity conditions | Time interval for periodic S-SLA re-registration or handshake | Optional |
| Subscription of S-SLA compliance monitoring events | Defines the regular interval for compliance notifications | Optional |
| Allowed IP-domains | Indicates which IP-domains are allowed for data to be passed through without extra protection | Optional |
| Extra data protection controls | Indicates which extra data protection options are required if there are no available routing options only within allowed IP-domains | Optional |

Figure 8

Enterprise A (S-SLA)

Service template (TD inner)
- Confidentiality: C1
- Integrity: I2
- Authentication: AA1

Service template (TD outer)
- Confidentiality: C1
- Integrity: I2
- Authentication: AA1
- Isolation: IS3
- Data sovereignty: DS2

CSP Monitoring Results

Monitoring results (TD inner)
- Confidentiality: C1
- Integrity: I2
- Authentication: AA1

Monitoring results (TD outer)
- Confidentiality: C1
- Integrity: I1
- Authentication: AA1
- Isolation: IS2
- Data sovereignty: DS2

Compliance Report

Enterprise A 16.04.2020 08:38

Service (Inner)

Confidentiality: Compliant (C1)
Integrity: Compliant (I2)
Authentication: Compliant (AA1)

Service (Outer)

Confidentiality: Compliant (C1)
Integrity: Non-Compliant Details: in use (I1), Agreed (I2)
Authentication: Compliant (AA1)
Isolation: Non-Compliant Details: in use (IS2), Agreed (IS3)
Data sovereignty: Compliant (DS2)

Figure 10

SECURITY SERVICE ORCHESTRATION FUNCTION FOR COMMERCIAL SECURITY SERVICE LEVEL AGREEMENTS

CROSS REFERENCE TO RELATED APPLICATIONS

This application is a 35 U.S.C. § 371 national stage application of PCT International Application No. PCT/EP2021/068810 filed on Jul. 7, 2021, the disclosure and content of which is incorporated by reference herein in its entirety.

TECHNICAL FIELD

The present disclosure relates generally to security orchestration and management of communications, and more particularly to methods and devices for a security service orchestration function for commercial security service level agreements.

BACKGROUND

Security orchestration and management is left outside the scope in information technology systems, and they do not deal with security concerns related to the deployment, configuration, or continuous operations of the information technology. Secure orchestration and management of virtualization, general forms of security management, e.g., monitoring are fundamental for computer systems to operate robustly. Since there are no specifications for security management and orchestration interfaces, vendor-specific, non-standard interfaces may appear which makes interoperability difficult, unstable, risky, and costly.

In commercial agreements between Communication Service Providers (CSP) and Enterprises, and between CPS's and End Users, security clauses are embedded in generic Service Level Agreements (SLAs) or do not exist. If defined at all, the definitions are static and often ambiguous.

Typical security related SLA clauses refer to Information Security Management System frameworks, such as ISO 27001, and conformance is based on self-assessments or audits and not in technical measures. More specific clauses may be used to define requirements for vulnerability management, incident handling and endpoint protection. The SLA's are used for defining the expected service level mostly in terms of quality, availability and responsibilities and the consequences in case the provider fails to comply with the SLA. The evaluation and possible compensations are time-based and relatively infrequent. SLA renegotiations typically take place upon contract renewal and are not dynamic in the nature.

Users of communication services are facing an increasing number of security and privacy threats against their data and services. Without visibility to the security posture and protective measures provided to them by CSPs, it is difficult to judge in reliable and repeatable manner if their expectations on security service levels are met and if there is a need for additional mitigation of security risks.

Generic Service Level Agreements do not necessarily include security aspects. Even if defined, the definitions are static and often ambiguous. There is no transparency of the security posture provided by the CSP so the Enterprise and End Users cannot properly assess the risks associated to the utilization of the CSP's services.

Current disadvantages include:

1. Communication service users, e.g., enterprises, are not able to place dynamic security requirements to the CSPs.
2. CSPs cannot report their own compliance towards the users' dynamic security requirements, (even if such requirements would exist)

Additionally, the following issues can be identified with current information technology systems:

1. Security is unconnected from other communications network functions, that is, there are no security orchestration capabilities or reference points towards various network functions and network entities.
2. There is no end-to-end security orchestration for services that are distributed between several domains or data centers.
3. Network functions have limited capabilities in terms of providing, exposing, and negotiating security information.
4. In today's solutions security and privacy information is transferred and processed as part of standard communications service orchestration which implies security risks and isolation challenges (defense in depth).
5. Current service level agreements between CSPs and enterprises are based on performance objectives related to availability and reliability. In few cases when security is taken into consideration, security is nonnegotiable, which means acquiring a service with specific security characteristics is not possible.
6. No current practice exists on how an enterprise (service user) can monitor and audit or a CSP can demonstrate in real time security attributes related to the offered service, in order to have a guarantee of security and privacy of the service, or to require updates to security levels of the service.

SUMMARY

According to some embodiments of inventive concepts, a security service orchestration function (SSOF) provides capabilities for security orchestration for an information technology system in a standardized manner. The SSOF enables submitting security service level agreement (S-SLA) based requirements as security attributes from an enterprise to a CSP through standardized interfaces and reference points. The SSOF negotiates and coordinates the necessary security attributes and their required levels between enterprises in the CSP's communications network. The SSOF converts the different enterprise S-SLA requirements into a consistent and unified S-SLA that the CSP offers to all of its enterprise customers. Based on the consistent and unified S-SLA, the CSP monitors and communicates the compliance status and compliance violations for the S-SLA to the enterprises.

According to some embodiments of inventive concepts, a method is implemented by a security service orchestration function (SSOF) in a communication infrastructure, that includes a communication service provider (CSP) and a plurality of enterprises, for orchestration of a security service level agreement (S-SLA). The method includes receiving a S-SLA request from one or more of the plurality of enterprises. Each S-SLA request includes a plurality of requirements. The method also includes converting each S-SLA request into a unique S-SLA corresponding to the plurality of requirements in the S-SLA request from an associated enterprise. Each unique S-SLA includes security attributes that the CSP is capable of providing to the enterprises. The method additionally includes offering the unique S-SLA to the associated enterprise for each enterprise that submitted the S-SLA request. The method further includes receiving a response from each enterprise. The response from each enterprise includes an acknowledgement of the unique S-SLA or a decline of the unique S-SLA including a non-repudiation signature of acknowledgement or declining.

According to some embodiments of inventive concepts, a computing device includes processing circuitry and a memory coupled with the processing circuitry. The memory includes instructions that when executed by the processing circuitry causes the computing device to receive a S-SLA request from one or more of a plurality of enterprises. Each S-SLA request comprises a plurality of requirements. The memory also includes instructions that when executed by the processing circuitry causes the computing device to convert each S-SLA request into a unique S-SLA corresponding to the plurality of requirements in the S-SLA request from an associated enterprise. Each unique S-SLA includes security attributes that the CSP is capable of providing to the enterprises. The memory also includes instructions that when executed by the processing circuitry causes the computing device to offer the unique S-SLA to the associated enterprise for each enterprise that submitted the S-SLA request. The memory further includes instructions that when executed by the processing circuitry causes the computing device to receive a response from each enterprise. The response from each enterprise includes an acknowledgement of the unique S-SLA or a decline of the unique S-SLA including a non-repudiation signature of acknowledgement or declining.

According to some embodiments of inventive concepts, a computing device is adapted to receive a S-SLA request from one or more of the plurality of enterprises. Each S-SLA request includes a plurality of requirements. The computing device is also adapted to convert each S-SLA request into a unique S-SLA corresponding to the plurality of requirements in the S-SLA request from an associated enterprise. Each unique S-SLA includes security attributes that the CSP is capable of providing to the enterprises. The computing device is also adapted to offer the unique S-SLA to the associated enterprise for each enterprise that submitted the S-SLA request.

The computing device is further adapted to receive a response from each enterprise. The response from each enterprise comprises an acknowledgement of the unique S-SLA or a decline of the unique S-SLA including a non-repudiation signature of acknowledgement or declining.

Certain embodiments may provide one or more of the following technical advantages:

- Ability to centrally orchestrate security capabilities and features in an information technology system for various network functions, network entities and services.
- Ability to request and provide common and consistent security attributes for an information technology system and future generations networks in a coordinated way.
- Ability to collect, share and expose enhanced security information with other network functions.
- Separation and isolation of security orchestration from service orchestration contributes to defense in depth principles.
- Provides standardized interfaces and reference points for security service orchestration.

All the above advantages are applicable for an information technology system in general. The embodiments described herein are applicable to privacy related orchestration in a similar way as for security orchestration.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 8 is a table including examples of information elements or objects included in a S-SLA request according to some embodiments of inventive concepts.

FIG. 10 is an illustration of an example of a compliance report according to some embodiments of inventive concepts.

DETAILED DESCRIPTION

Inventive concepts will now be described more fully hereinafter with reference to the accompanying drawings, in which examples of embodiments of inventive concepts are shown.

Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
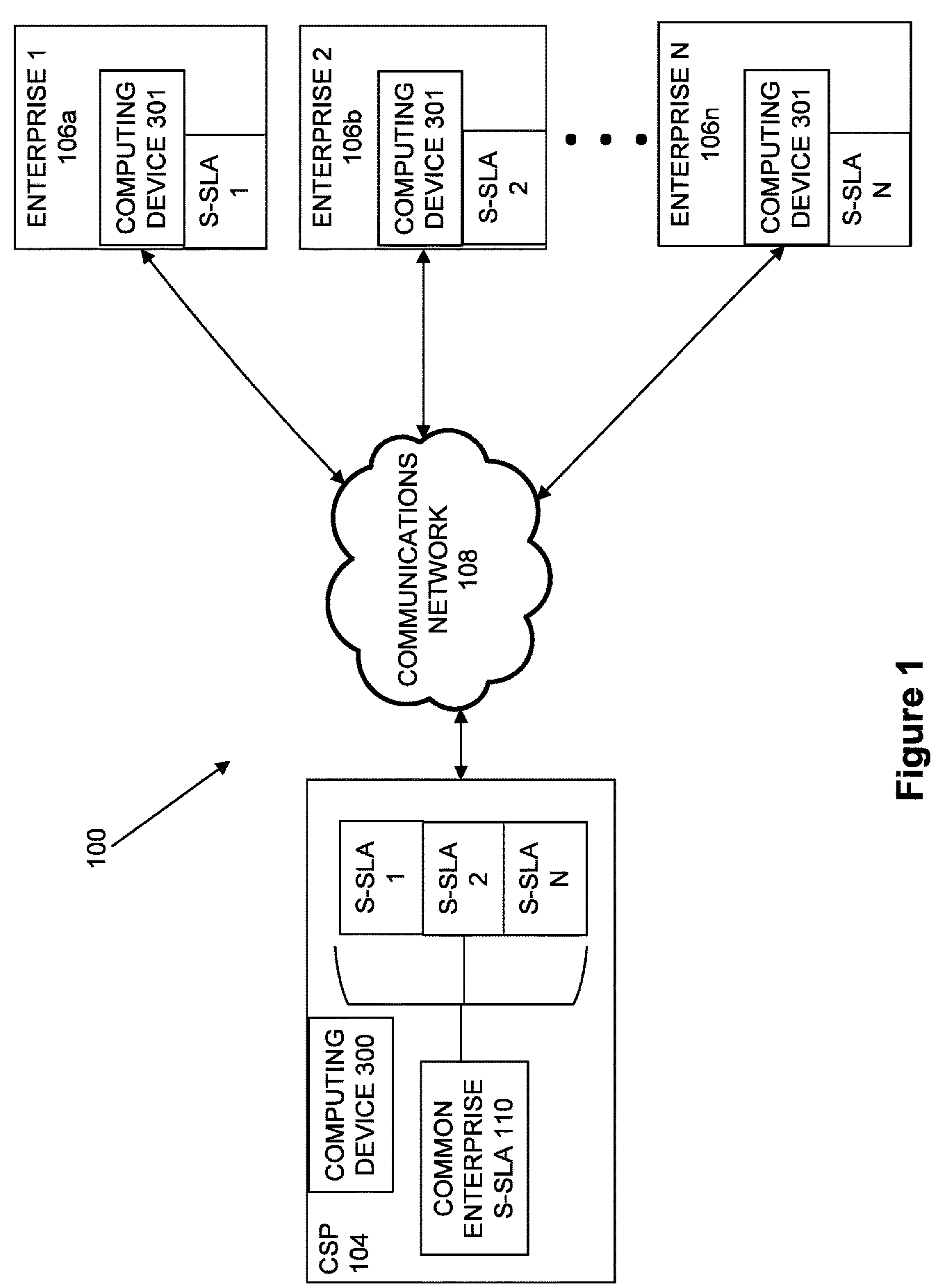
FIG. 1 is a block diagram of an example of a communication system including a security service level agreement (S-SLA) negotiation schema according to some embodiments of inventive concepts.
Figure 3:
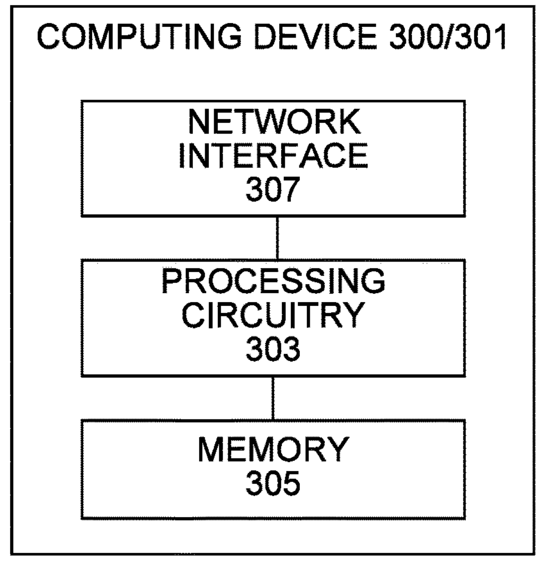
FIG. 3 is a block diagram of an example of a computing device according to some embodiments of inventive concepts.

FIG. 1 is a block diagram of an example of a communication system 100 including a security service level agreement (S-SLA) negotiation schema according to some embodiments of inventive concepts. Embodiments of the inventive concepts described herein are applicable to any communication system or information technology system based on network elements and appliances. The exemplary communication system 100 includes a communication service provider (CSP) 104 and a plurality of enterprises 106 shown in FIG. 1 as enterprises 106*a*-106*n*. The CSP 104 and the enterprises 106 communicate with one another via a communications network 108. The communications network 108 is any type of communications network, e.g., a wireless communications network, a wired communications network or combination wireless and wired communications network. In accordance with some examples, the CSP 104 includes a computing device 300 and each of the enterprises 106*a*-106*n* include a computing device 301. An example of a computing device 300 and 301 that may be used will be described with reference to FIG. 3. The CSP 104 and the enterprises 106*a*-106*n* may include any type of computing devices or communications device including additional components and different types of components than those illustrated in the example in FIG. 3. The exemplary computing device 300/301 illustrated in FIG. 3 is shown as including minimal generic components for performing the inventive concepts described herein.

As described in more detail herein, each enterprise 106*a*-106*n* may request a S-SLA shown as S-SLA 1-S-SLA N in FIG. 1. Each enterprise S-SLA includes enterprise specific security requirements and/or service specific security requirements. The S-SLA enterprise specific security requirements and/or service specific security requirements define security attributes and associated security values or strengths. The S-SLA service specific security requirements or security attributes are negotiated between the CSP 104 and each of the enterprises 106*a*-106*n* as described in more detail with reference to FIGS. 4 and 7. The CSP 104 or SSOF 202 of the CSP 104 converts the different enterprise S-SLA requirements into a consistent and unified S-SLA offered to each of the enterprises 106*a*-106*n*. The consistent and unified S-SLA is also referred to a common enterprise S-SLA 110.

Figure 2:
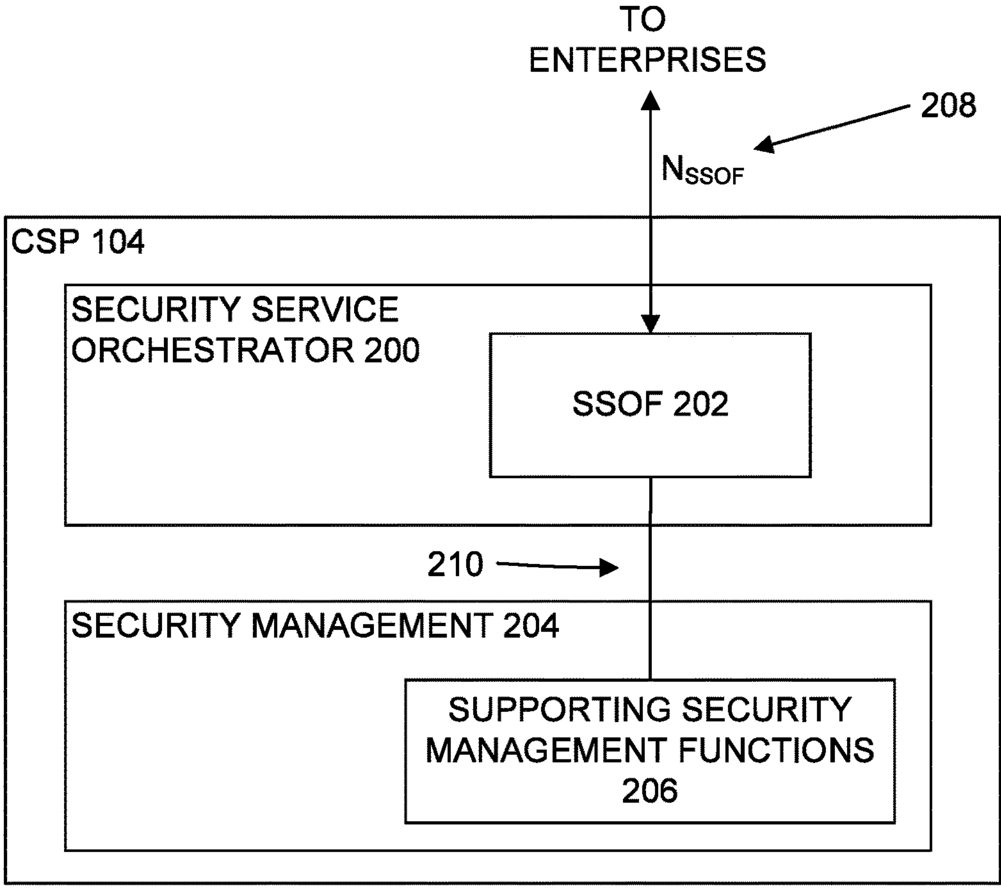
FIG. 2 is a block diagram of an example of a security service orchestrator and security management module according to some embodiments of inventive concepts.

S-SLA enablement and enforcement in a communication system or information technology system, e.g., system 100 is implemented as a security service orchestration function (SSOF) 202 embodied in a security service orchestrator 200 (FIG. 2). The SSOF 202 interacts directly with different network functions.

The communication system 100 or information technology system is designed to be able to offer a different mix of capabilities to meet very diverse service requirements at the same time. This means that security requirements for service may also be very different from industry to industry, service to service and per business customer or enterprise.

In general problems with existing solutions is that it is not possible for enterprises to place (dynamic) security requirements to the CSP and later monitor the compliance of how well these requirements are achieved by the CSP. There is a need to have well defined standardized list of security attributes that can characterize security for the network services. These security attributes are negotiable between the CSP 104 and their business customers or enterprises 106. Different enterprises 106 have different security needs to protect their service, thus negotiable security attributes may vary depending on enterprise 106 and the industry segment the enterprise 106 represents. For example, enterprises in the public safety area may have rather different security requirements to protect their services than for instance an enterprise in automotive, energy, healthcare or manufacturing industry.

Negotiable security attributes can be categorized based on the main security principles: confidentiality, integrity, authentication and authorization, availability, expanded with separate categories for isolation and data sovereignty.

Enterprises 106 can define in a negotiation phase what security attributes they want to include in their S-SLA and whether the security attributes are applicable for services for all enterprise locations. Attribute values, that is, strength of security protection may vary when service is offered for these different locations or from different data centers. Examples of security attribute categories and attribute values or strength of security protection include:

Confidentiality attributes (C) ensure that the service is protected from unwanted information disclosure, e.g., packets/traffic are not possible of disclosure outside the service. Different crypto algorithms and strength for those algorithms can be requested. Examples for confidentiality attributes that can be requested for the services include, e.g., different strengths for Advanced Encryption Standard (AES): AES-128, AES-192, AES-256 and Triple Data Encryption Algorithm (TDES).

Integrity attributes (I) ensure that the service integrity can be preserved, e.g., packets/traffic are not tampered with or replaced without noticing. Different integrity algorithms and strength for those algorithms can be requested. Examples of integrity attributes that can be requested for the services include, e.g., different strengths for Secure Hash Algorithms (SHA): SHA-2, SHA-3, SHAKE128, SHAKE256.

Authentication and authorization attributes (AA) ensure that only authorized persons, user accounts and network elements can interact with the service. Different authentication and authorization mechanisms for the service can be requested. Examples of authentication and authorization mechanisms include, e.g., multi-factor authentication for users, strong Key based authentication, Role Based Access Control (RBAC) or Attribute Based Access Control (ABAC).

Non-repudiation attributes (NR) ensure the assurance that someone cannot deny something. Non-repudiation artifacts include: an identity, the authentication of that identity and tangible evidence connecting the identified party to a particular communication or action. Different non-repudiation mechanisms can be requested, for instance different digital signature algorithms such as RSA, DSA, ECDSA, RSA with SHA.

Availability attributes (A) ensure that the service and network functions providing the service remain accessible all the time for authorized users. Different availability mechanisms can be requested. Examples of availability mechanisms include extra security functions to be instantiated or activated, e.g., Physical or Virtual Security Functions such as (virtual) Firewalls, Load balancers, Rate limiters, etc.

Isolation attributes (IS) ensure that the service resources are not shared among other network users or services, e.g., information transferred is isolated from that of other service users. Different isolation mechanism can be requested. Examples of isolation mechanisms include service specific isolation to ensure none of the network resources are shared with other customers or enterprises.

Data sovereignty attributes (DS) ensure that the data stays within specific jurisdictions or data centers. Different data sovereignty mechanism can be requested. Example of data sovereignty attributes include, e.g., requesting allocation of network resources only from allowed IP domains, anonymization and pseudonymization of data if it is not possible to route the data traffic entirely within the specified jurisdictions. Data sovereignty attribute may also indicate that a data object should be dropped if the data object is moving to a forbidden jurisdiction, or before the data object can be transferred to another jurisdiction it may be split into smaller parts.

Each enterprise 106 has their own security intent and objectives which is driven by security risk evaluation and understanding. Each enterprise 106 translates this security risk evaluation into security attributes defined in their S-SLA. For example, the S-SLA may include information as to what extent the enterprise tolerates variation in different security attributes and what measures are mandatory to achieve their desired protection level.

The example in FIG. 1 illustrates Security Service Level Agreement (S-SLA) negotiation between the CSP 104 and the enterprises 106*a*-106*n*. FIG. 1 illustrates how CSP security attributes for each enterprise 106 are negotiated:

S-SLA negotiation between CSP 104 and enterprises 106*a*-106*n* where the CSP 104 converts different enterprise S-SLA requirements into a consistent and unified S-SLA (common enterprise S-SLA 110) offered to the enterprises 106*a*-106*n*.

The CSP 104 has, based on its own security risk assessment and ambition level, its own communications network specific security requirements that are applied to its network and services.

FIG. 2 is a block diagram of an example of a security service orchestrator 200 and security management module 204 according to some embodiments of inventive concepts. In the example in FIG. 2, the security service orchestrator 200 includes the SSOF 202. The security orchestration is a component of the CSP 102. In other examples, the security service orchestrator 200 and/or SSOF 202 are a separate component associated with the CSP 102. The security management module 204 includes supporting security management functions 206.

Examples of operations or functions of the supporting security management functions 206 will be described with reference to FIGS. 5 and 6. The SSOF 202 includes a northbound interface which is Nssof-Enterprise reference point 208 used for S-SLA negotiation with the enterprises 106*a*-106*n* and for exchanging information on S-SLA security attributes. The Nssof-Enterprise reference point 208 includes interfaces Nssof_EnterpriseS-SLAOrchestration and Nssof_EnterpriseS-SLACompliance. The SSOF 202 also includes a southbound interface 210 used for interacting with the supporting security management functions 206. Information on the consistent and unified S-SLA or common enterprise S-SLA 110 and respective security attributes are transferred between the CSP 104 and the enterprises 106*a*-106*n* over the Nssof reference point 208. The following NF services are specified for the SSOF 202 as illustrated in FIG. 2:

| Service name | Description |
|---|---|
| Nssof_EnterpriceS-SLAOrchestration | Used for being informed about S-SLA and the negotiable security attributes between CSP and Enterprises |

-continued

| Service name | Description |
|---|---|
| Nssof_EnterpriseS-SLACompliance | Used for being informed about S-SLA compliance status and compliance violations for the agreed security policies and attributes CSP and Enterprises |

FIG. 3 is a block diagram of an example of a computing device 300/301 according to some embodiments of inventive concepts. In accordance with some examples, as previously described, the CSP 104 includes a computing device 300 and each of the enterprises include a computing device 301. In the example in FIG. 3, the computing devices 300 and 301 are shown as being the same and including the same components; however, in other examples, the computing devices 300 and 301 may include different components. The embodiment shown in FIG. 3 includes exemplary components for performing the inventive concepts described herein. The exemplary computing device 300 or 301 includes processing circuitry 303, a memory 305 and a network interface circuitry 307. The processing circuitry 503 may control network interface circuitry 307 to transmit communications through network interface circuitry 307 to one or more network nodes of the communications network 108 or enterprises 106*a*-106*n* in the example in FIG. 1 and/or to receive communications through the network interface circuitry 307 from one or more network nodes or enterprises 106*a*-106*n* to perform the inventive concepts described herein. Moreover, modules may be stored in memory 305, and these modules may provide instructions so that when instructions of a module are executed by processing circuitry 303, processing circuitry 303 performs respective operations. In some examples, the memory 305 coupled with the processing circuitry 303 includes instructions that when executed by the processing circuitry 305 causes the computing device 300 or 301 to perform at least some of the functions of the methods described herein. In some examples, the methods described herein performed by the SSOF 202 and the supporting security management functions 206 are embodied in and performed by one or more computing devices that are the same or similar to computing device 300 or 301. For example, the SSOF 202 and the supporting security management function 206 are embodied on the same computing device 300 or 301 or separate computing devices 300 or 301.

Figure 4:
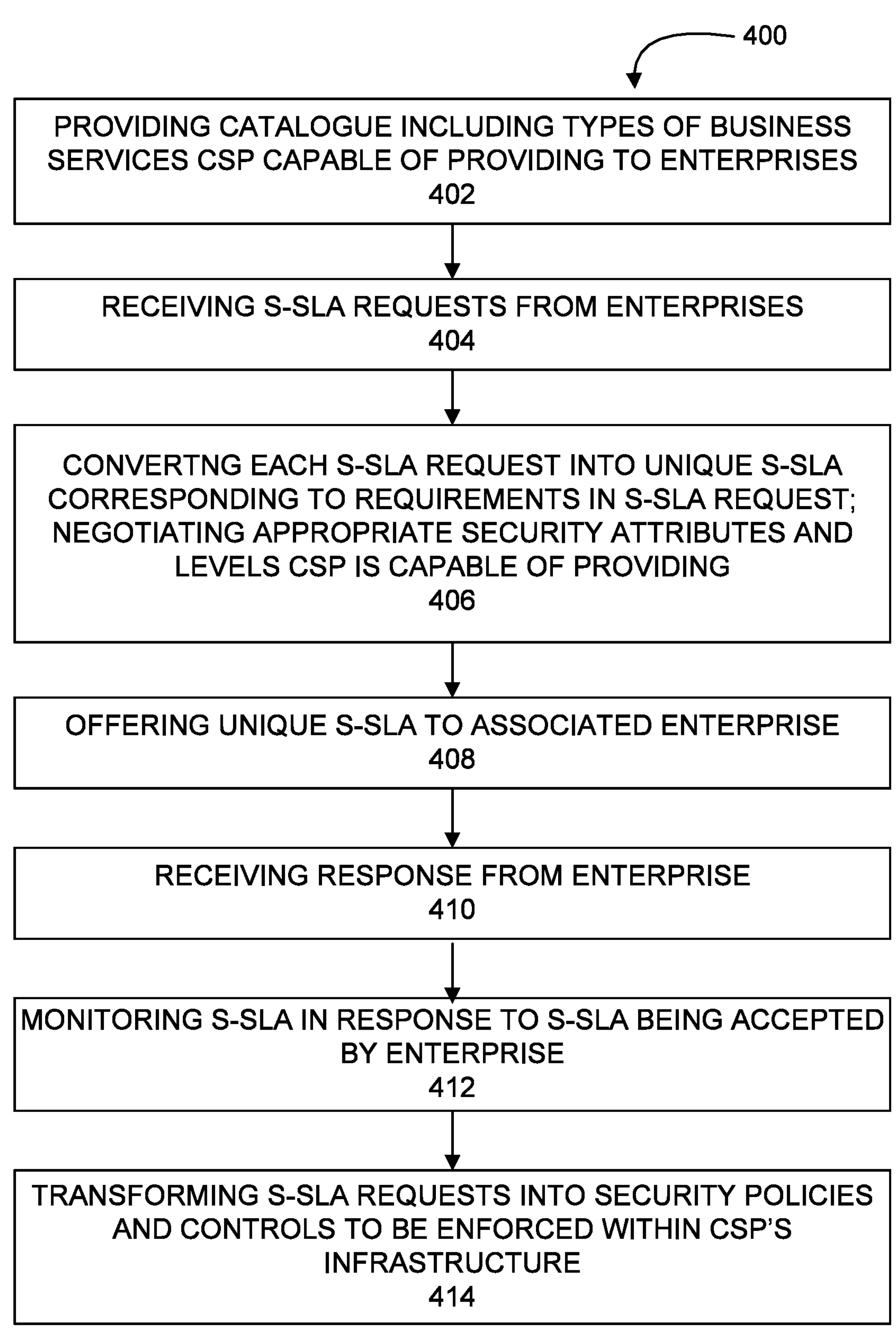
FIG. 4 is a flow chart of an example of a method of operation of a security service orchestration function (SSOF) according to some embodiments of inventive concepts.

FIG. 4 is a flow chart of an example of a method 400 of operation of a security service orchestration function (SSOF) according to some embodiments of inventive concepts. The method 400 is implemented by a security service orchestration function (SSOF), such as SSOF 202 in FIG. 2, in a communication infrastructure, that includes a communication service provider, e.g., CSP 104 and a plurality of enterprises, e.g., enterprises 106*a*-106*n*, for orchestration of a security service level agreement (S-SLA), e.g., common enterprise S-SLA 110.

The SSOF 202 is the primary security orchestration function communicating between the CSP 104 and the enterprises 106*a*-106*n* and other network functions and network entities within the CSP infrastructure supporting security service level agreement negotiation based on the security attributes. The objective of the SSOF 202 is to ensure consistency of security policies. The described mechanism can be applied to privacy attributes in a similar way.

In block 402, the method 400 includes providing a catalogue including types of business services and the business service specific security attributes for each type of business service the CSP is capable of providing and that are includable in the S-SLA request from each enterprise. In some examples, the catalogue is provided by the CSP to each enterprise.

In block 404, the method 400 includes receiving a S-SLA request from one or more of the plurality of enterprises. Each S-SLA request includes a plurality of requirements. In some examples, receiving the S-SLA request includes receiving a specific business service request from the one or more enterprises. The business service request includes one or more business service specific security attributes and a level or value associated with each security attribute.

In some examples, receiving the S-SLA request also includes receiving the S-SLA request for business services within an internal trust domain of the CSP, within an external trust domain of the CSP, or both. The internal trust domain of the CSP may also be referred to as an inner trust domain or trust domain internal or inner to an infrastructure of the CSP. The external trust domain may also be referred to as an outer trust domain or trust domain external or outer to an infrastructure of the CSP, e.g., a trust domain or another CSP or VPLMN.

The S-SLA request from each enterprise includes a plurality of optional information elements or objects and mandatory information elements or objects. Examples of the optional information elements or objects and mandatory information elements or objects are included in a table 800 in FIG. 8. Column 802 of the table 800 includes a name of the information element or object. Column 804 includes a description of the information element or object and column 806 includes a category of the information element or object, e.g., whether the information element or object is a mandatory information element or object, or an optional information element or object. In some examples, the plurality of optional information elements or objects include, confidentiality attributes, target integrity attributes, target authentication attributes, target availability attributes, target non-repudiation attributes, target isolation attributes, target data sovereignty attributes, validity condition, temporal validity condition, subscription of S-SLA compliance monitoring events, allowed internet protocol (IP) domains, and extra data protection controls. In some examples, the mandatory information elements or objects include a target enterprise identifier.

In block 406, the method 400 includes converting each S-SLA request into a unique S-SLA corresponding to the plurality of requirements in the S-SLA request from an associated enterprise. Each unique S-SLA includes security attributes that the CSP is capable of providing to the enterprises. The method 400 in block 406 also includes negotiating a set of appropriate security attributes and associated levels or values with each enterprise, that the CSP is capable of providing each enterprise 106*a*-106*n*. In some examples, the unique S-SLA corresponds to a consistent and unified S-SLA or common enterprise S-SLA 110 that is offered by the CSP 104 to each enterprise 106*a*-106*n*. The consistent and unified S-SLA or common enterprise S-SLA 110 for each enterprise may include different security attribute levels or values (unique S-SLA) based on the security requirements in the S-SLA request from each enterprise and the security attributes the CSP is capable of providing.

In block 408, the method 400 includes offering the unique S-SLA to the associated enterprise for each enterprise that submitted the S-SLA request.

In block 410, the method 400 includes receiving a response from each enterprise. The response from each enterprise includes an acknowledgement of the unique S-SLA or a decline of the unique S-SLA including a non-repudiation signature of acknowledgement or declining.

In block 412, the method 400 includes monitoring the unique S-SLA by the CSP or SSOF in response to the unique S-SLA being acknowledged or accepted by the enterprise.

In block 414, the method 400 includes transforming the S-SLA requests into security policies and controls to be enforced with the CSP's infrastructure.

Figure 5:
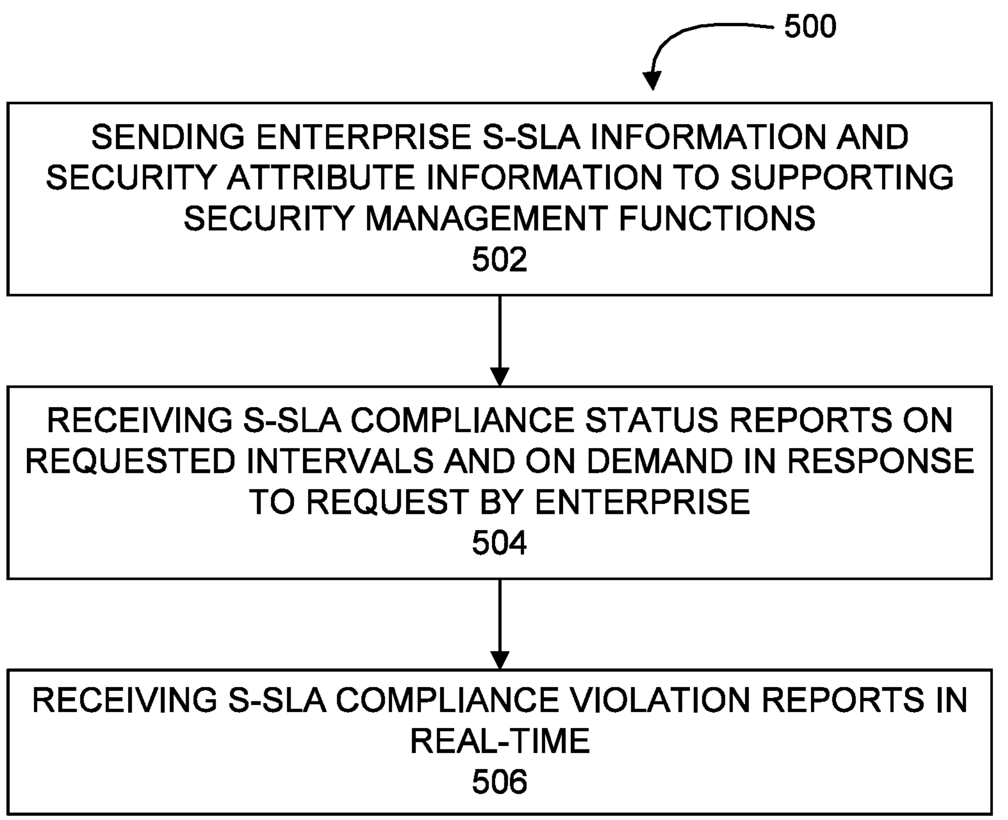
FIG. 5 is a flow chart of an example of a method of operation of a SSOF interacting with supporting security management functions according to some embodiments of inventive concepts.

FIG. 5 is a flow chart of an example of a method 500 of operation of a SSOF interacting with supporting security management functions according to some embodiments of inventive concepts. In block 502, the method 500 includes sending enterprise S-SLA information and security attribute information to the supporting security management functions. In block 504, the method 500 includes receiving S-SLA compliance status reports on requested intervals and on demand in response to a request from the enterprise. In block 506, the method 500 includes receiving S-SLA compliance violation reports in real-time.

Figure 6:
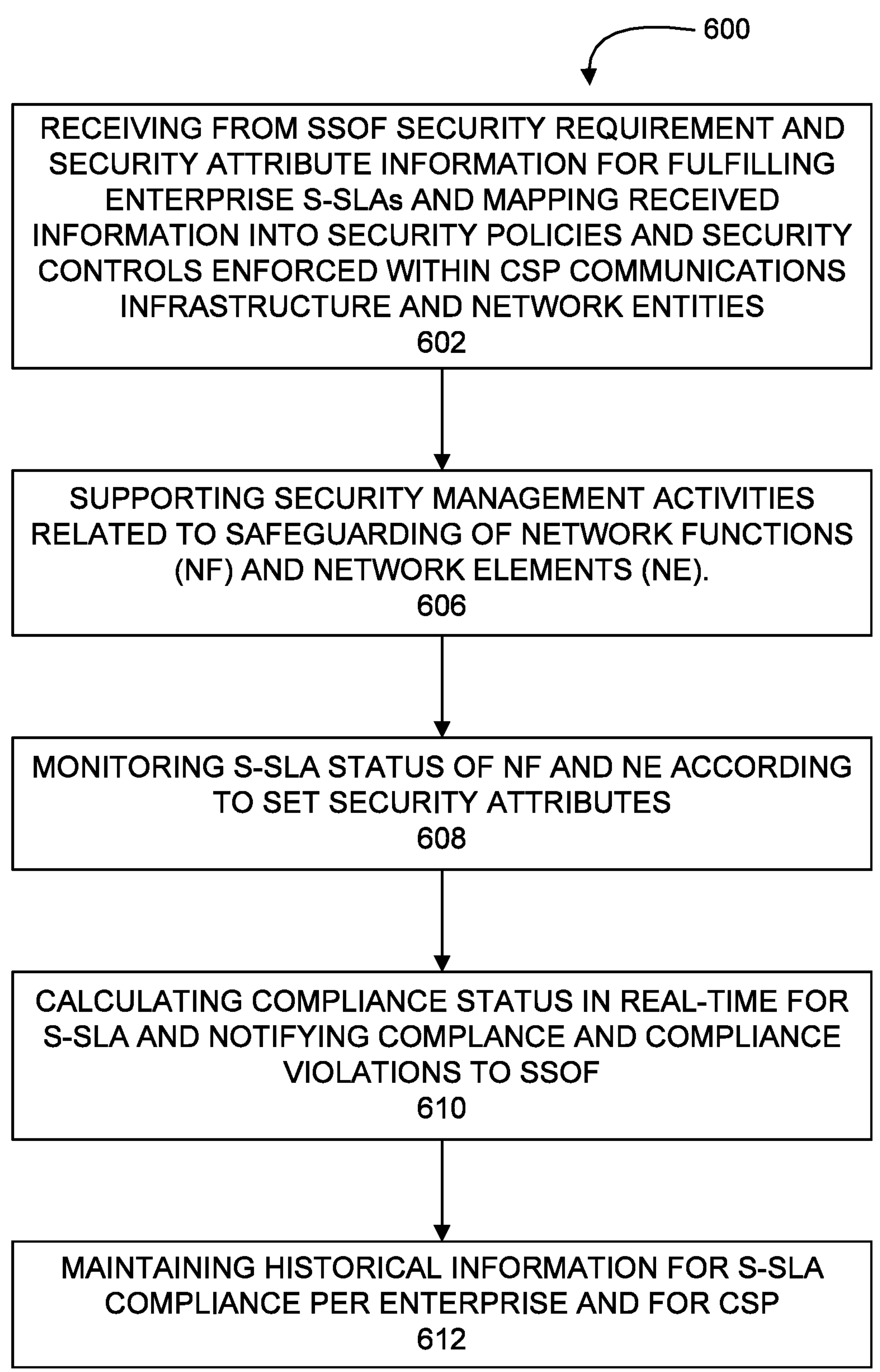
FIG. 6 is a flow chart of an example of a method of operation of supporting security management functions according to some embodiments of inventive concepts.

FIG. 6 is a flow chart of an example of a method 600 of operation of supporting security management functions according to some embodiments of inventive concepts. The supporting security management functions include at least one of the functions of blocks 602-612. In block 602, the method 600 includes receiving, from the SSOF, security requirement and security attribute information for fulfilling each enterprise S-SLA and mapping the security requirement and security attribute information into security policies and security controls for enforcement within the CSP's communications infrastructure and network entities.

In block 606, the method 600 includes supporting security management activities related to safeguarding of network functions (NF) and network elements (NE).

In block 608, the method 600 includes monitoring S-SLA status of NF and NE according to set security attributes.

In block 610, the method 600 includes calculating compliance status in real-time for each enterprise S-SLA and notifying compliance scores and compliance violations to the security service orchestration function.

In block 612, the method includes maintaining historical information for S-SLA compliance per enterprise and for the CSP.

Figure 7:
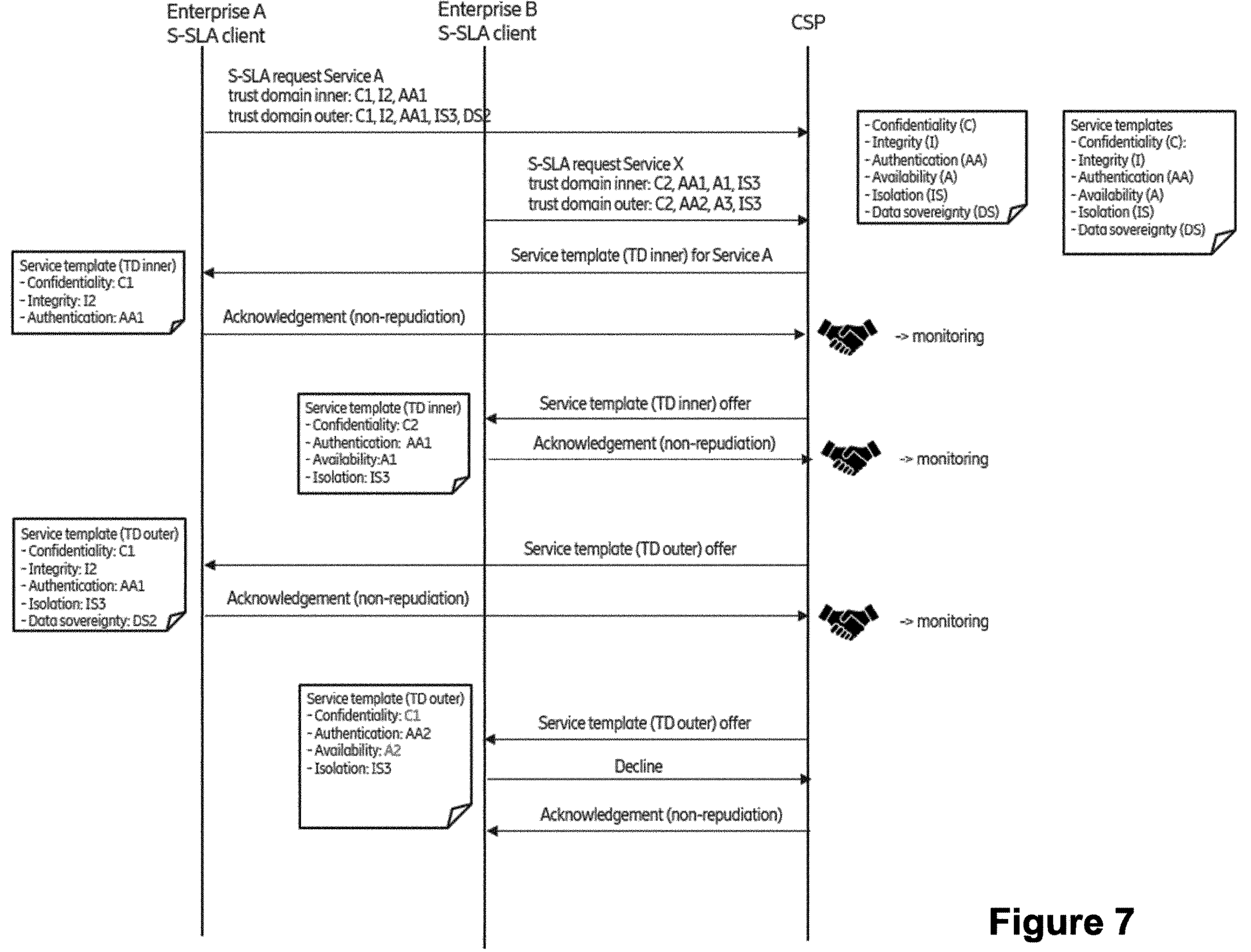
FIG. 7 is an illustration of an example of an agreement flow for S-SLA negotiation according to some embodiments of inventive concepts.

FIG. 7 is an illustration of an example of an agreement flow for S-SLA negotiation according to some embodiments of inventive concepts. The method 400 in FIG. 4 and the operations described with reference to blocks 602-612 correspond the messages and information transmitted between each of the enterprises, Enterprise A and Enterprise B, and the CSP in FIG. 7. Similar to block 402 in FIG. 4, at initialization state the CSP has provided to each enterprise or enterprise customers (enterprise A and enterprise B) a catalogue for different types of business services the enterprises can request from the CSP and a catalogue of security attributes with attribute value ranges that can be requested from the CSP.

Each enterprise requests the CSP to support a specific business service with specific security attributes according to enterprise security objectives. The CSP receives S-SLA requests for the services within the CSP's own trust domain and the CSP's external trust domain including all security attributes from the enterprise as illustrated in FIG. 7. For instance, the CSP's own trust domain (internal or inner trust domain) may represent a data center within the home country. The external trust domain may represent a data center in a foreign country under a different jurisdiction. If the service can be provided, the CSP SSOF will negotiate appropriate security attributes with each enterprise S-SLA client.

Each enterprise initiates the S-SLA negotiation using the agreement flow illustrated in FIG. 7. Each enterprise sends a S-SLA request including desired security attributes and their associated security levels or values to the CSP. If the service can be provided, CSP SSOF will negotiate appropriate security attributes and associated security levels or values with the enterprise S-SLA client.

The CSP responds with S-SLA offers with security attributes the CSP can fulfill within its capabilities. This procedure is repeated per enterprise, per service and per trust domain. The enterprise can decline the CSP offered S-SLA if the S-SLA does not meet the security objectives of the enterprise. Accepted offers result in agreed service requirements with agreed and guaranteed security attributes. Service enters automatically into regular monitoring and reporting mode at the CSP to ensure S-SLA fulfillment. A use case of an example of monitoring and reporting to ensure S-SLA fulfillment will be described with reference to FIG. 9.

Figure 9:
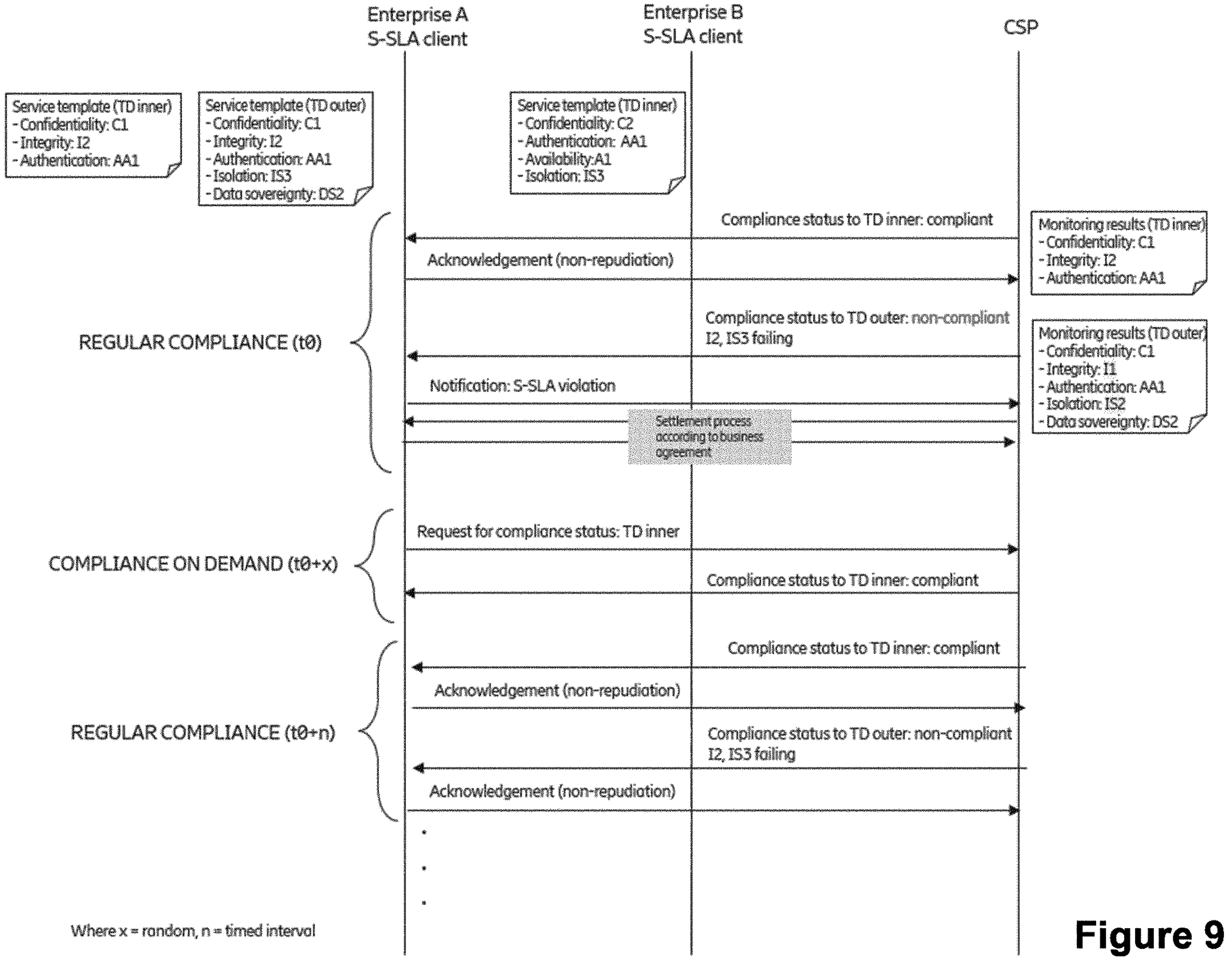
FIG. 9 is an illustration of an example a monitoring flow for S-SLA fulfillment according to some embodiments of inventive concepts.

FIG. 9 is an illustration of an example a monitoring flow for S-SLA fulfillment according to some embodiments of inventive concepts. In some embodiments, the example illustrated in FIG. 9 corresponds to the monitoring in block 412 of FIG. 4. The CSP monitors agreed and guaranteed S-SLA security attributes for different services within the CSP's own trust domain (internal or inner trust domain) and the CSP external trust domain or outer trust domain. For example, in a 3GPP architecture the CSP's own trust domain represents a home public land mobile network (HPLMN) and the external trust domain represents a visited public land mobile network (VPLMN). Another context is a cloud service where cloud service provider's own trust domain represent data centers within the same geographical area and external trust domain represents data centers under a different jurisdiction.

The CSP monitors and reports S-SLA compliance to the enterprises in requested regular intervals or on demand. An enterprise can request compliance reports in random intervals as illustrated in FIG. 9. As illustrated in FIG. 9, a settlement process is performed according to the S-SLA in response to notification of an S-SLA violation from the enterprise to the CSP.

FIG. 10 is an illustration of an example of a compliance report according to some embodiments of inventive concepts. In the exemplary report illustrated in FIG. 10, the service within the CSP's own trust domain is fully compliant and the service outside the CSP's own trust domain is not compliant on two different attributes, i.e., integrity (I1) and isolation (IS2) cannot meet the requested levels I2 and IS3, respectively. If S-SLA compliance deviates from the agreed level, then settlement process according to the S-SLA is triggered.

Example embodiments are discussed below.

1. A method implemented by a security service orchestration function (SSOF) in a communication infrastructure, that includes a communication service provider (CSP) and a plurality of enterprises, for orchestration of a security service level agreement (S-SLA), the method comprising:
 - receiving a S-SLA request from one or more of the plurality of enterprises, wherein each S-SLA request comprises a plurality of requirements;
 - converting each S-SLA request into a unique S-SLA corresponding to the plurality of requirements in the S-SLA request from an associated enterprise, wherein each unique S-SLA comprises security attributes that the CSP is capable of providing to the enterprises;
 - offering the unique S-SLA to the associated enterprise for each enterprise that submitted the S-SLA request; and
 - receiving a response from each enterprise, wherein the response from each enterprise comprises an acknowledgement of the unique S-SLA or a decline of the unique S-SLA including a non-repudiation signature of acknowledgement or declining.

2. The method of embodiment 1, further comprising providing, by the CSP to each enterprise, a catalogue comprising types of business services and the business service specific security attributes for each type of business service the CSP is capable of providing and that are includable in the S-SLA request from each enterprise.

3. The method of any of embodiments 1-2, wherein receiving the S-SLA request comprises receiving a specific business service request from the one or more enterprises, wherein the business service request comprises one or more business service specific security attributes and a level associated with each security attribute.

4. The method of any of embodiments 1-3, wherein receiving the S-SLA request comprises receiving the S-SLA request for business services within an internal trust domain of the CSP.

5. The method of any of embodiments 1-4, wherein receiving the S-SLA request comprises receiving the S-SLA request for business services within an external trust domain of the CSP.

6. The method of any of embodiments 1-5, further comprising negotiating a set of appropriate security attributes and levels with each enterprise that the CSP is capable of providing.

7. The method of any of embodiments 1-6, wherein the S-SLA request from each enterprise comprises a plurality of optional information elements or objects and mandatory information elements or objects,
 - wherein the plurality of optional information elements or objects comprises, confidentiality attributes, target integrity attributes, target authentication attributes, target availability attributes, target non-repudiation attributes, target isolation attributes, target data sovereignty attributes, validity condition, temporal validity condition, subscription of S-SLA compliance monitoring events, allowed internet protocol (IP) domains, and extra data protection controls, and
 - wherein the mandatory information elements or objects comprise a target enterprise identifier.

8. The method of any of embodiments 1-7, further comprising monitoring the unique S-SLA by the CSP in response to the unique S-SLA being acknowledged or accepted by the enterprise.

9. The method of embodiment 1, wherein the SSOF interacts with supporting security management functions to perform a set of functions comprising:
 - sending enterprise S-SLA information and security attribute information to the supporting security management functions;
 - receiving S-SLA compliance status reports on requested intervals and on demand in response to a request from the enterprise; and
 - receiving S-SLA compliance violation reports in real-time.

10. The method of embodiment 9, wherein the supporting security management functions comprise at least one of:
 - receiving, from the SSOF, security requirement and security attribute information for fulfilling each enterprise S-SLA and mapping the security requirement and security attribute information into security policies and security controls for enforcement within the CSP's communications infrastructure and network entities;

supporting security management activities related to safeguarding of network functions (NF) and network elements (NE);

monitoring S-SLA status of NF and NE according to set security attributes;

calculating compliance status in real-time for each enterprise S-SLA and notifying compliance scores and compliance violations to the security service orchestration function; and maintaining historical information for S-SLA compliance per enterprise and for the CSP.

11. The method of any of embodiments 1-10, further comprising a Nssof reference point used for S-SLA negotiation with the enterprises and exchanging information on S-SLA security attributes.

12. A computing device (300) comprising:

processing circuitry (303); and memory (305) coupled with the processing circuitry, wherein the memory includes instructions that when executed by the processing circuitry causes the computing device to, receive a S-SLA request from one or more of the plurality of enterprises, wherein each S-SLA request comprises a plurality of requirements;

convert each S-SLA request into a unique S-SLA corresponding to the plurality of requirements in the S-SLA request from an associated enterprise, wherein each unique S-SLA comprises security attributes that the CSP is capable of providing to the enterprises;

offer the unique S-SLA to the associated enterprise for each enterprise that submitted the S-SLA request; and receive a response from each enterprise, wherein the response from each enterprise comprises an acknowledgement or of the unique S-SLA or a decline of the unique S-SLA including a non-repudiation signature of acknowledgement or declining.

13. The computing device of embodiment 12, wherein the memory includes instructions that when executed by the processing circuitry causes the computing device to perform operations according to any of embodiments 2-11.

14. A computing device (300) adapted to:

receive a S-SLA request from one or more of the plurality of enterprises, wherein each S-SLA request comprises a plurality of requirements;

convert each S-SLA request into a unique S-SLA corresponding to the plurality of requirements in the S-SLA request from an associated enterprise, wherein each unique S-SLA comprises security attributes that the CSP is capable of providing to the enterprises;

offer the unique S-SLA to the associated enterprise for each enterprise that submitted the S-SLA request; and receive a response from each enterprise, wherein the response from each enterprise comprises an acknowledgement of the unique S-SLA or a decline of the unique S-SLA including a non-repudiation signature of acknowledgement or declining.

15. The computing device of embodiment 14 further adapted to perform according to any of embodiments 2-11.

16. A computer program comprising program code to be executed by processing circuitry (303) of a computing device (300), whereby execution of the program code causes the computing device (300) to perform operations according to any of embodiments 1-11.

17. A computer program product comprising a non-transitory storage medium including program code to be executed by processing circuitry (303) of a computing device (300), whereby execution of the program code causes the computing device (300) to perform operations according to any of embodiments 1-11.

Additional explanation is provided below.

The innovative steps in Security Service Orchestrator Function (SSOF) are that:

Embedding security specific orchestration capabilities into a communication infrastructure to solve security concerns related to the deployment and configuration of the technology.

Introducing SSOF function to exchange security related information according to industry best practices and communication architectures.

Coverage of security attributes is expanded from CIA to address isolation and data sovereignty.

Common and consistent S-SLA negotiation and handshake for CSPs and enterprises.

Increasing trust since there is agreed/standardized mechanism to agree security attributes and security levels between CSP and enterprise.

Real-time S-SLA compliance monitoring for S-SLA fulfillment for CSP and enterprises.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being “connected”, “coupled”, “responsive”, or variants thereof to another element, it can be directly connected, coupled, or responsive to the other element or intervening elements may be present. In contrast, when an element is referred to as being “directly connected”, “directly coupled”, “directly responsive”, or variants thereof to another element, there are no intervening elements present. Like numbers refer to like elements throughout. Furthermore, “coupled”, “connected”, “responsive”, or variants thereof as used herein may include wirelessly coupled, connected, or responsive. As used herein, the singular forms “a”, “an” and “the” are intended to include the plural forms as well, unless the context clearly indicates otherwise. Well-known functions or constructions may not be described in detail for brevity and/or clarity. The term “and/or” includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms “comprise”, “comprising”, “comprises”, “include”, “including”, “includes”, “have”, “has”, “having”, or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation “e.g.,”, which derives from the Latin phrase “exempli gratia,” may be used to introduce or specify a general example or examples of a previously mentioned item, and is not intended to be limiting of such item. The common abbreviation “i.e.,”, which derives from the Latin phrase “id est,” may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as “circuitry,” “a module” or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts.

Accordingly, the above disclosed subject matter is to be considered illustrative, and not restrictive, and the examples of embodiments are intended to cover all such modifications, enhancements, and other embodiments, which fall within the spirit and scope of present inventive concepts.

Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

AAA Authentication, Authorization, Accounting
AES Advanced Encryption Standard
CIA Confidentiality, Integrity, Availability
CSP Communications service provider
DSA Digital signature standard
ECDSA Elliptic curve digital signature algorithm
NF Network Function
NE Network Entity
OSS Operations Support System
RSA Rivest-Shamir-Adleman public-key cryptosystem
SHA Secure Hash Algorithms
S-SLA Security Service Level Agreement
SSOF Security Orchestration Function
TDES Triple Data Encryption Algorithm

The invention claimed is:

1. A method implemented by a security service orchestration function, SSOF, wherein the SSOF is a primary security orchestration function that communicates between a communication service provider, CSP, and a plurality of enterprises and that interacts with supporting security management functions within a communications infrastructure of the CSP, for orchestration of a security service level agreement, S-SLA, the method comprising:

receiving a S-SLA request from one or more of the plurality of enterprises, wherein each S-SLA request comprises a plurality of requirements, and the S-SLA request from each of the one or more of the plurality of enterprises comprises a plurality of optional information elements or objects and mandatory information elements or objects, wherein the plurality of optional information elements or objects comprises: confidentiality attributes, target integrity attributes, target authentication attributes, target availability attributes, target non-repudiation attributes, target isolation attributes, target data sovereignty attributes, validity condition, temporal validity condition, subscription of S-SLA compliance monitoring events, allowed internet protocol domains, and extra data protection controls, and wherein the mandatory information elements or objects comprise a target enterprise identifier;

negotiating security attributes and required levels of the security attributes between the enterprises in a communications network of the CSP;

converting each S-SLA request into a unique S-SLA corresponding to the plurality of requirements in the S-SLA request from an associated enterprise, wherein each unique S-SLA comprises security attributes that the CSP provides to the enterprises;

offering the unique S-SLA to the associated enterprise for each enterprise that submitted the S-SLA request; and receiving a response from each enterprise, wherein the response from each enterprise comprises an acknowledgement of the unique S-SLA or a decline of the unique S-SLA including a non-repudiation signature of acknowledgement or declining.

2. The method of claim 1, further comprising providing, by the CSP to each enterprise, a catalogue comprising types of business services and business service specific security attributes for each type of business service the CSP provides and that are includable in the S-SLA request from each enterprise.

3. The method of claim 1, wherein receiving the S-SLA request comprises receiving a specific business service request from one or more enterprises, wherein the business service request comprises one or more business service specific security attributes and a level associated with each security attribute.

4. The method of claim 1, wherein receiving the S-SLA request comprises receiving the S-SLA request for business services within an internal trust domain of the CSP.

5. The method of claim 1, wherein receiving the S-SLA request comprises receiving the S-SLA request for business services within an external trust domain of the CSP.

6. The method of claim 1, further comprising negotiating a set of appropriate security attributes and levels with each enterprise that the CSP provides.

7. The method of claim 1, further comprising monitoring the unique S-SLA by the CSP in response to the unique S-SLA being acknowledged or accepted by the associated enterprise.

8. The method of claim 1, wherein the SSOF interacts with supporting security management functions to perform a set of functions comprising:

sending enterprise S-SLA information and security attribute information to the supporting security management functions;

receiving S-SLA compliance status reports on requested intervals and on demand in response to a request from the associated enterprise; and receiving S-SLA compliance violation reports in real-time.

9. The method of claim 8, wherein the supporting security management functions comprise at least one of:

receiving, from the SSOF, security requirement and security attribute information for fulfilling each enterprise S-SLA and mapping the security requirement and security attribute information into security policies and security controls for enforcement within the CSP's communications infrastructure and network entities;

supporting security management activities related to safeguarding of network functions, NF, and network elements, NE;

monitoring S-SLA status of NF and NE according to set security attributes;

calculating compliance status in real-time for each enterprise S-SLA and notifying compliance scores and compliance violations to the security service orchestration function; and maintaining historical information for S-SLA compliance per enterprise and for the CSP.

10. The method of claim 1, further comprising a northbound SSOF reference point used for S-SLA negotiation with the enterprises and exchanging information on S-SLA security attributes.

11. A computing device comprising:

processing circuitry; and memory coupled with the processing circuitry, wherein the memory includes instructions that when executed by the processing circuitry causes the computing device to implement a security service orchestration function, SSOF, wherein the SSOF is a primary security orchestration function that communicates between a communication service provider, CSP, and a plurality of enterprises and that interacts with supporting security management functions within a communications infrastructure of the CSP, the computing device configured to:

receive a S-SLA request from one or more of the plurality of enterprises, wherein each S-SLA request comprises a plurality of requirements, and the S-SLA request from each one of the one or more of the plurality of enterprises comprises a plurality of optional information elements or objects and mandatory information elements or objects, wherein the plurality of optional information elements or objects comprises: confidentiality attributes, target integrity attributes, target authentication attributes, target availability attributes, target non-repudiation attributes, target isolation attributes, target data sovereignty attributes, validity condition, temporal validity condition, subscription of S-SLA compliance monitoring events, allowed internet protocol domains, and extra data protection controls, and wherein the mandatory information elements or objects comprise a target enterprise identifier;

negotiate security attributes and required levels of the security attributes between the enterprises in a communications network of the CSP;

convert each S-SLA request into a unique S-SLA corresponding to the plurality of requirements in the S-SLA request from an associated enterprise, wherein each unique S-SLA comprises security attributes that the CSP provides to the enterprises;

offer the unique S-SLA to the associated enterprise for each enterprise that submitted the S-SLA request; and receive a response from each enterprise, wherein the response from each enterprise comprises an acknowledgement of the unique S-SLA or a decline of the unique S-SLA including a non-repudiation signature of acknowledgement or declining.

12. The computing device of claim 11, wherein the memory includes instructions that when executed by the processing circuitry causes the computing device to perform operations to provide, by the CSP to each enterprise, a catalogue comprising types of business services and business service specific security attributes for each type of business service the CSP provides and that are includable in the S-SLA request from each enterprise.

13. The computing device of claim 11, wherein the memory includes instructions that when executed by the processing circuitry causes the computing device to perform operations to receive a specific business service request from one or more enterprises, wherein the specific business service request comprises one or more business service specific security attributes and a level associated with each security attribute.

14. The computing device of claim 11, wherein the memory includes instructions that when executed by the processing circuitry causes the computing device to perform operations to receive the S-SLA request for business services within an internal trust domain of the CSP.

15. The computing device of claim 11, wherein the memory includes instructions that when executed by the processing circuitry causes the computing device to perform operations to receive the S-SLA request for business services within an external trust domain of the CSP.

16. The computing device of claim 11, wherein the memory includes instructions that when executed by the processing circuitry causes the computing device to perform operations to negotiate a set of appropriate security attributes and levels with each enterprise that the CSP provides.

17. The computing device of claim 11, wherein the memory includes instructions that when executed by the processing circuitry causes the computing device to perform operations to monitor the unique S-SLA by the CSP in response to the unique S-SLA being acknowledged or accepted by the associated enterprise.

18. The computing device of claim 11, wherein the SSOF interacts with supporting security management functions to perform a set of functions comprising to:

send enterprise S-SLA information and security attribute information to the supporting security management functions;

receive S-SLA compliance status reports on requested intervals and on demand in response to a request from the associated enterprise; and receive S-SLA compliance violation reports in real-time.

19. The computing device of claim 11, further comprising a northbound SSOF reference point used for S-SLA negotiation with the enterprises and exchanging information on S-SLA security attributes.

* * * * *